(12) United States Patent
Peterson et al.

(10) Patent No.: US 7,956,584 B2
(45) Date of Patent: Jun. 7, 2011

(54) ELECTRIC POWER GENERATION SYSTEM WITH MULTIPLE ALTERNATORS DRIVEN BY A COMMON PRIME MOVER

(75) Inventors: Mitchell E. Peterson, Maple Grove, MN (US); Sergey Kunin, Minnetonka, MN (US)

(73) Assignee: Cummins Power Generation IP, Inc., Minneapolis, MN (US)

( * ) Notice: Subject to any disclaimer, the term of this patent is extended or adjusted under 35 U.S.C. 154(b) by 701 days.

(21) Appl. No.: 11/809,768

(22) Filed: Jun. 1, 2007

(65) Prior Publication Data
US 2008/0157594 A1 Jul. 3, 2008

Related U.S. Application Data

(60) Provisional application No. 60/877,970, filed on Dec. 29, 2006.

(51) Int. Cl.
*F02D 29/06* (2006.01)
*H02P 9/00* (2006.01)

(52) U.S. Cl. ........................................ 322/44; 290/40 C (58) Field of Classification Search ................ 290/40 C, 290/4 A, 4 C, 4 R; 322/44, 59; 310/112, 310/114
See application file for complete search history.

(56) References Cited

U.S. PATENT DOCUMENTS

| | | | |
|---|---|---|---|
| 3,047,724 A * | 7/1962 | Neufville et al. | ............. 290/4 R |
| 3,571,693 A | 3/1971 | Riaz | |
| 4,063,162 A | 12/1977 | Lanz et al. | |
| 4,208,693 A | 6/1980 | Dickens et al. | |
| 4,245,182 A | 1/1981 | Aotsu et al. | |
| 4,262,212 A | 4/1981 | Jacob et al. | |
| 4,443,828 A | 4/1984 | Legrand et al. | |
| 4,574,340 A | 3/1986 | Baker | |
| 4,589,052 A | 5/1986 | Dougherty | |
| 4,661,769 A | 4/1987 | Girgis | |
| 4,728,806 A | 3/1988 | Baker et al. | |
| 4,835,405 A | 5/1989 | Clancey et al. | |
| 4,855,664 A | 8/1989 | Lane | |
| 4,912,382 A | 3/1990 | Koenig et al. | |
| 4,935,689 A * | 6/1990 | Fujikawa et al. | ................. 322/1 |
| 4,992,920 A | 2/1991 | Davis | |

(Continued)

FOREIGN PATENT DOCUMENTS

WO   WO2005/046044 A1   5/2005

(Continued)

*Primary Examiner* — Julio Cesar Gonzalez
(74) *Attorney, Agent, or Firm* — J. Bruce Schelkopf; L. Scott Paynter; Krieg DeVault LLP (57) ABSTRACT

An apparatus includes a vehicular electric power generation system comprising a variable speed internal combustion engine, a first variable speed electric power generator driven by the engine, a second variable speed electric power generator driven by the engine, a first inverter to receive electric power from the first generator a provide a first controlled electric output, a second inverter to receive electric power from the second generator and provide a second controlled electric output, and a controller coupled to the engine. The controller is responsive to variation in electrical loading of the first inverter and the second inverter and a degree of electrical load imbalance between the first inverter and second inverter to provide one or more engine control signals. The engine is responsive to the one more engine control signals to change rotational operating speed to adjust for the variation in electrical loading and the degree of electrical load imbalance.

11 Claims, 5 Drawing Sheets

U.S. PATENT DOCUMENTS

| | | | |
|---|---|---|---|
| 4,994,953 A * | 2/1991 | Haak | 363/71 |
| 4,996,646 A | 2/1991 | Farrington | |
| 5,006,781 A | 4/1991 | Schultz et al. | |
| 5,023,537 A * | 6/1991 | Baits | 318/732 |
| 5,028,804 A | 7/1991 | Lauw | |
| 5,029,120 A | 7/1991 | Brodeur et al. | |
| 5,117,174 A | 5/1992 | Kessler | |
| 5,168,208 A | 12/1992 | Schultz et al. | |
| 5,305,185 A | 4/1994 | Samarov et al. | |
| 5,315,229 A | 5/1994 | Markus | |
| 5,390,068 A | 2/1995 | Schultz et al. | |
| 5,406,495 A | 4/1995 | Hill | |
| 5,433,175 A | 7/1995 | Hughes et al. | |
| 5,587,647 A | 12/1996 | Bansal et al. | |
| 5,587,917 A | 12/1996 | Elms | |
| 5,592,021 A | 1/1997 | Meschter et al. | |
| 5,592,393 A | 1/1997 | Yalla | |
| 5,701,070 A * | 12/1997 | Schultz | 322/37 |
| 5,784,267 A | 7/1998 | Koenig et al. | |
| 5,890,097 A | 3/1999 | Cox | |
| 5,909,656 A | 6/1999 | Yang | |
| 6,037,768 A | 3/2000 | Moulder et al. | |
| 6,038,267 A | 3/2000 | Oura et al. | |
| 6,088,226 A | 7/2000 | Rearick | |
| 6,144,092 A | 11/2000 | Kappes et al. | |
| 6,166,469 A * | 12/2000 | Osama et al. | 310/90.5 |
| 6,173,216 B1 | 1/2001 | Vu et al. | |
| 6,392,371 B1 | 5/2002 | Cheng et al. | |
| 6,483,708 B2 | 11/2002 | Ali et al. | |
| 6,545,870 B1 | 4/2003 | Franke et al. | |
| 6,549,410 B1 | 4/2003 | Cohen | |
| 6,617,703 B2 * | 9/2003 | Matsubara et al. | 290/40 C |
| 6,654,250 B1 | 11/2003 | Alcoe | |
| 6,765,157 B2 | 7/2004 | Rademacher et al. | |
| 6,782,941 B2 | 8/2004 | Lee | |
| 6,801,019 B2 | 10/2004 | Haydock et al. | |
| 6,965,818 B2 | 11/2005 | Koenig et al. | |
| 6,969,922 B2 | 11/2005 | Welches et al. | |
| 6,972,972 B2 | 12/2005 | Duncan et al. | |
| 6,984,897 B2 | 1/2006 | Skeist et al. | |
| 6,994,360 B2 | 2/2006 | Kuang et al. | |
| 7,002,259 B2 | 2/2006 | Howes et al. | |
| 7,034,427 B2 | 4/2006 | Hirzel | |
| 7,042,110 B2 * | 5/2006 | Mikhail et al. | 290/44 |
| 7,102,331 B2 | 9/2006 | Walter et al. | |
| 2002/0044422 A1 | 4/2002 | Bailey et al. | |
| 2004/0057212 A1 | 3/2004 | Russell et al. | |
| 2004/0084965 A1 | 5/2004 | Welches et al. | |
| 2005/0035657 A1 | 2/2005 | Brummett et al. | |
| 2006/0087123 A1 * | 4/2006 | Stout et al. | 290/2 |
| 2006/0109701 A1 | 5/2006 | Morcov et al. | |
| 2007/0007837 A1 * | 1/2007 | Mukai et al. | 310/112 |

FOREIGN PATENT DOCUMENTS

WO    WO 2006/090111 A2    8/2006

* cited by examiner

ELECTRIC POWER GENERATION SYSTEM WITH MULTIPLE ALTERNATORS DRIVEN BY A COMMON PRIME MOVER

CROSS-REFERENCE TO RELATED APPLICATIONS

The present application claims the benefit of U.S. Provisional Patent Application No. 60/877,970 filed on 29 Dec. 2006, and is related to U.S. patent application Ser. No. 11/600,937 filed 16 Nov. 2006, U.S. patent application Ser. No. 11/788,942 filed 23 Apr. 2007 and U.S. patent application Ser. No. 11/789,913 Filed 26 Apr. 2007, all of which are hereby incorporated by reference each in its entirety.

BACKGROUND

The present invention relates to electric power systems, and more particularly, but not exclusively, relates to management of electric power provided by a system including a variable speed generator driven by an engine that has multiple inverters.

In many applications of electrical generator systems, steady state load demand is typically low relative to generator power capacity because generator selection is often driven by peak power requirements—resulting in an "oversized" generator most of the time. As an alternative, in certain situations power generation systems could include an electrical energy storage device to supplement generator power during peak usage, which facilitates a reduction in generator size. Alternatively or additionally, a variable speed generator can be used that changes speed based on power demand. A generally fixed AC frequency and voltage output can be provided from a variable speed generator by utilizing appropriate power conversion circuitry. Unfortunately, these systems typically do not offer different voltage outputs simultaneously, such as 120 volts and 240 volts—leading to a need for alternatives. Indeed, there is an ongoing demand for further contributions in this area of technology.

SUMMARY

One embodiment of the present invention includes a unique technique involving electric power generation. Other embodiments include unique methods, systems, devices, and apparatus involving electric power generation. Further embodiments, forms, features, aspects, benefits, and advantages of the present application shall become apparent from the description and figures provided herewith.

DETAILED DESCRIPTION OF REPRESENTATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 1:
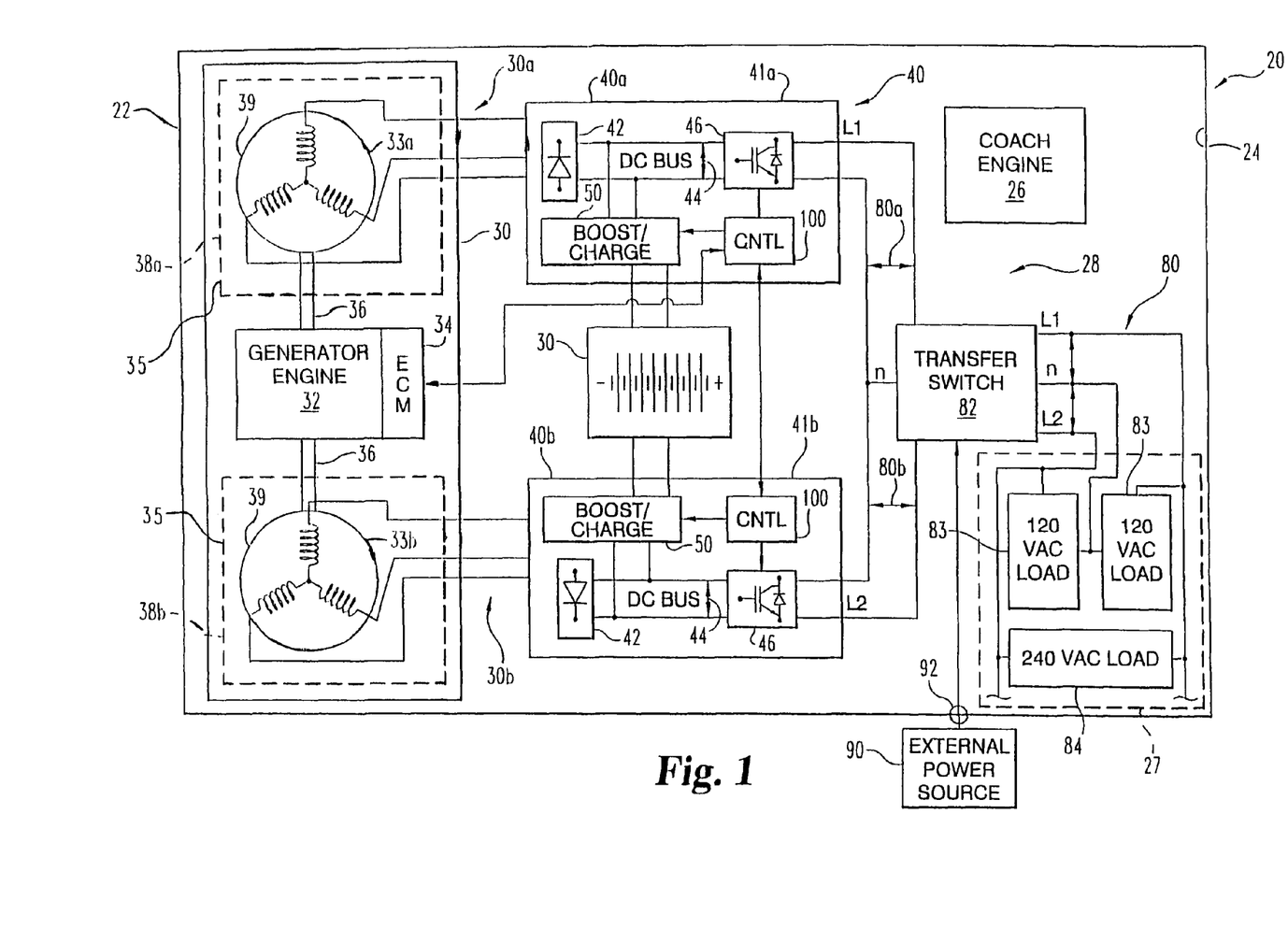
FIG. 1 is a diagrammatic view of a vehicle carrying an electric power generation system with multiple generator subsystems.

FIG. 1 illustrates vehicle 20 in the form of a motor coach 22. Motor coach 22 includes interior living space 24 and is propelled by coach engine 26. Coach engine 26 is typically of a reciprocating piston, internal combustion type. To complement living space 24, coach 22 carries various types of electrical equipment 27 (shown schematically), such as lighting, kitchen appliances, entertainment devices, one or more air conditioners, and/or such different devices as would occur to those skilled in the art. Coach 22 carries mobile electric power generation system 28 to selectively provide electricity to equipment 27. Correspondingly, equipment 27 electrically loads system 28. In one form, various components of system 28 are distributed throughout vehicle 20—being installed in various bays and/or other dedicated spaces (not shown).

System 28 includes two primary sources of power: Alternating Current (AC) power from genset 30 and Direct Current (DC) power from electrical energy storage device 70. Genset 30 includes a dedicated generator engine 32 that is regulated by engine controller 34, which is sometimes designated an Engine Control Module (ECM). Engine controller 34 is responsive to control signals from power control and conversion circuitry 40 as further described hereinafter. In one arrangement, engine 32 is of a reciprocating piston type. Genset 30 includes a rotary drive member 36 and two generators 38a and 38b each having a three-phase output. Each generator 38a and 38b is driven by member 36. In one form, generators 38a and 38b are provided by two different, electrically isolated three-phase windings of a stator 35 (e.g., as shown in FIG. 1) of a permanent magnet alternator (PMA) configuration. For this form, generators 38a and 38b share a common armature that is a form of rotor 39 fixed to a drive shaft form of member 36, to rotate simultaneously therewith. Alternatively, generators 38a and 38b can be provided by separate stators/armatures (e.g., as designated in FIG. 1 by reference numbers 33a and 33b)/rotors or the like and/or may be other than a PMA type. As an alternative to direct shaft mounting, generators 38a and/or 38b can be mechanically coupled to engine 32 by a mechanical linkage that provides a desired turn ratio, a torque converter, a transmission, a belt, a chain, gears, and/or a different form of rotary linking mechanism as would occur to those skilled in the art.

The rotational operating speed of engine 32, and correspondingly rotational speed of generators 38a and 38b vary over a selected operating range in response to changes in electrical loading of system 28. Over this range, genset rotational speed increases to meet larger power demands concomitant with an increasing electrical load on system 28. Genset 30 has a steady state minimum speed at the lower extreme of this speed range corresponding to low power output and a steady state maximum speed at the upper extreme of this speed range corresponding to high power output. As the speed of genset 30 varies, its three-phase electrical output varies in terms of AC frequency and voltage.

Genset 30 is electrically coupled to power control and conversion circuitry 40. Circuitry 40 includes conversion/inverter circuitry 40a coupled to receive variable AC electrical input power from generator 38a and conversion/inverter circuitry 40b coupled to receive variable AC electrical input power from generator 38b. Circuitry 40a is further designated a primary control/inverter 41a and circuitry 40b is further designated secondary control/inverter 41b. Generator 38a and circuitry 40a are designated collectively power generation subsystem 30a, and generator 38b and circuitry 40b are designated collectively power generation subsystem 30b.

Subsystems 30a and 30b each include three-phase rectifier 42, a variable voltage DC power bus 44, a DC-to-AC power inverter 46, charge and boost circuitry 50, and controller (CNTL) 100. Rectifier 42 converts the respective three-phase input to a variable DC voltage on bus 44. As regulated by controller 100, electric power on DC bus 44 is converted with inverter 46 to provide a controlled electrical output at a target AC frequency and voltage for each respective subsystem 30a and 30b. Certain aspects of these features of subsystems 30a and 30b are further described in connection with FIGS. 2 and 3 hereinafter.

Subsystems 30a and 30b both are coupled to electrical energy storage device 70 to selectively charge it in certain operating modes and supply electrical energy from it (or "boost") in other operating modes via circuitry 50 as further described hereinafter. Circuitry 40a and 40b selectively provides DC electric power through respective circuitry 50 to the storage device 70 via the respective DC bus 44. Various DC loads may be powered from device 70 and/or circuitry 40 (not shown). Device 70 may be provided in the form of one or more rechargeable electrochemical cells or batteries, or of such different type as would occur to those skilled in the art.

The two inverters 46 of circuitry 40a and 40b are coupled together to define a common electrical node "n" corresponding to a neutral line. Inverter 46 of circuitry 40a further defines electrical node L1 corresponding to power line/output of power bus 80a and inverter 46 of circuitry 40a further defines electrical node L2 corresponding to another power line/output of power bus 80b. Buses 80a and 80b share a common neutral line n due to the connection between inverters 46. System 28 further includes bus 80 coupled to the outputs of AC power transfer switch 82. Buses 80a and 80b of inverters 46 provide one set of inputs to switch 82; and external AC electrical power source 90 (shore power) provides another set of inputs to switch 82 via external power interface 92. It should be appreciated that shore power generally cannot be used when vehicle 20 is in motion, may not be available in some locations; and even if available, shore power is typically limited by a circuit breaker or fuse. When power from source 90 is applied, genset 30 is typically not active. Transfer switch 82 selects between power through inverters 46 (a power source internal to vehicle 20) and power form "shore" (external source 90) to service various AC electrical loads of equipment 27 on bus 80. With the supply of external AC power from source 90, assembly 40 selectively functions as one of these loads, converting the AC shore power to a form suitable to charge storage device 70. In the following description, AC shore power should be understood to be absent unless expressly indicated to the contrary.

Equipment 27 comprises various AC electrical loads that are supplied via AC bus 80 through switch 82. Included in these loads are two 120 Volt AC (VAC) loads 83a and 83b each electrically coupled across a different one of lines (nodes) L1 and L2, respectively, to neutral line of (node) n. Also included is 240 VAC load 84 electrically coupled across both lines L1 and L2. It should be appreciated that the AC waveform output phase on lines L1 and L2 can be controlled via inverters 46 so that current flow through the neutral line is no greater than the maximum current flow through either line L1 or L2 (i.e. lines L1 and L2 are 180 degrees out of phase). As a result, any conductors for L1, L2, and n can be sized the same for such an arrangement. Furthermore, it should be appreciated that this arrangement effectively combines the voltage output by inverters 46 to provide the sum of the voltages across both loads 83a and 83b to load 84. In this specific case, 240 VAC for load 84 is nominally about twice that of 120 VAC for loads 83a or 83b.

Controller 100 for each of subsystems 30a and 30b executes operating logic that defines various control, management, and/or regulation functions. This operating logic may be in the form of dedicated hardware, such as a hard-wired state machine, programming instructions, and/or a different form as would occur to those skilled in the art. Controller 100 may be provided as a single component, or a collection of operatively coupled components; and may be comprised of digital circuitry, analog circuitry, or a hybrid combination of both of these types. When of a multi-component form, controller 100 may have one or more components remotely located relative to the others. Controller 100 can include multiple processing units arranged to operate independently, in a pipeline processing arrangement, in a parallel processing arrangement, and/or such different arrangement as would occur to those skilled in the art. In one embodiment, controller 100 is a programmable microprocessing device of a solid-state, integrated circuit type that includes one or more processing units and memory. Controller 100 can include one or more signal conditioners, modulators, demodulators, Arithmetic Logic Units (ALUs), Central Processing Units (CPUs), limiters, oscillators, control clocks, amplifiers, signal conditioners, filters, format converters, communication ports, clamps, delay devices, memory devices, and/or different circuitry or functional components as would occur to those skilled in the art to perform the desired communications. Controllers 100 of subsystems 30a and 30b are both coupled to communication bus 94. In one form, bus 94 is of a standard Controller Area Network (CAN) type.

Figure 2:
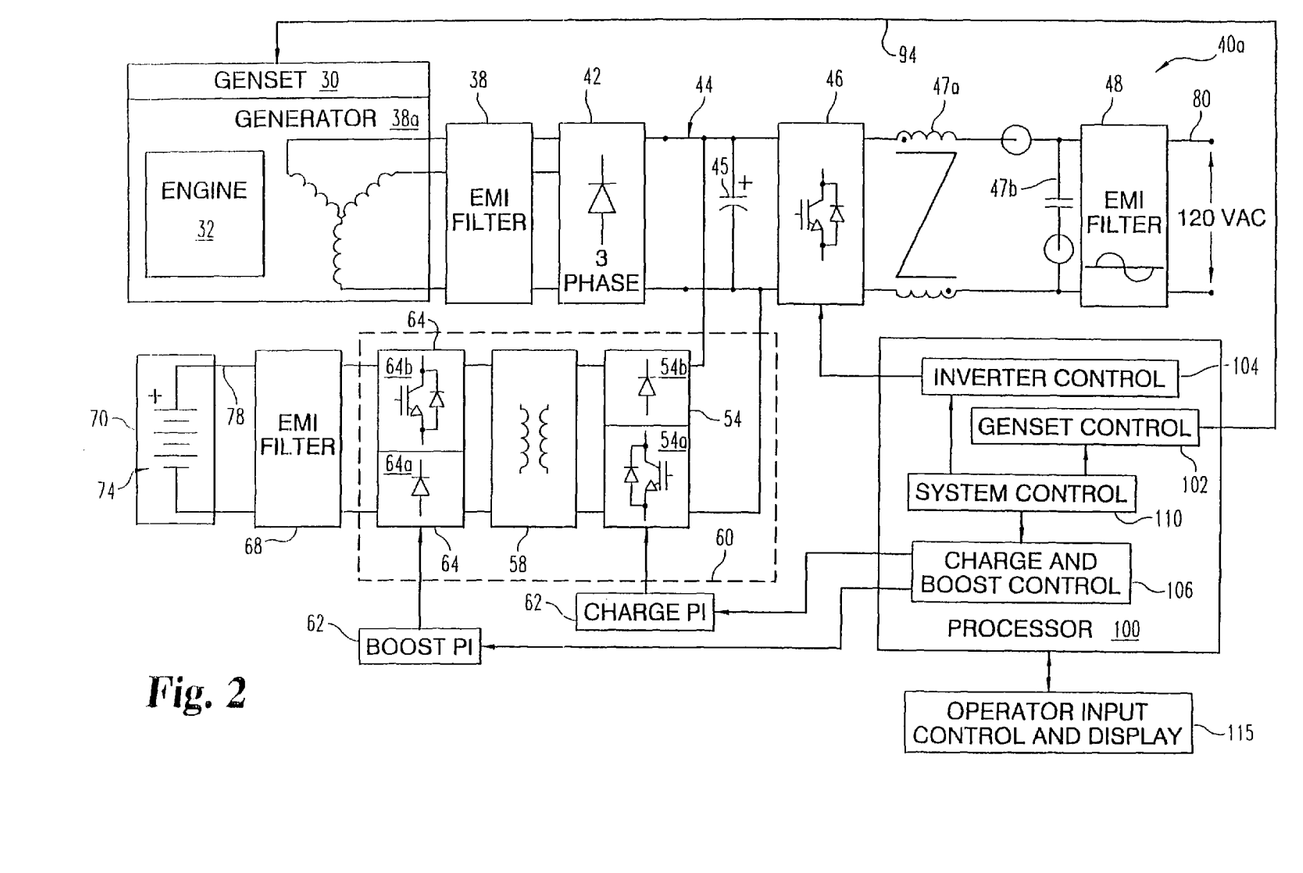
FIG. 2 is a schematic view of circuitry associated with one of the generator subsystems shown in FIG. 1.
Figure 3:
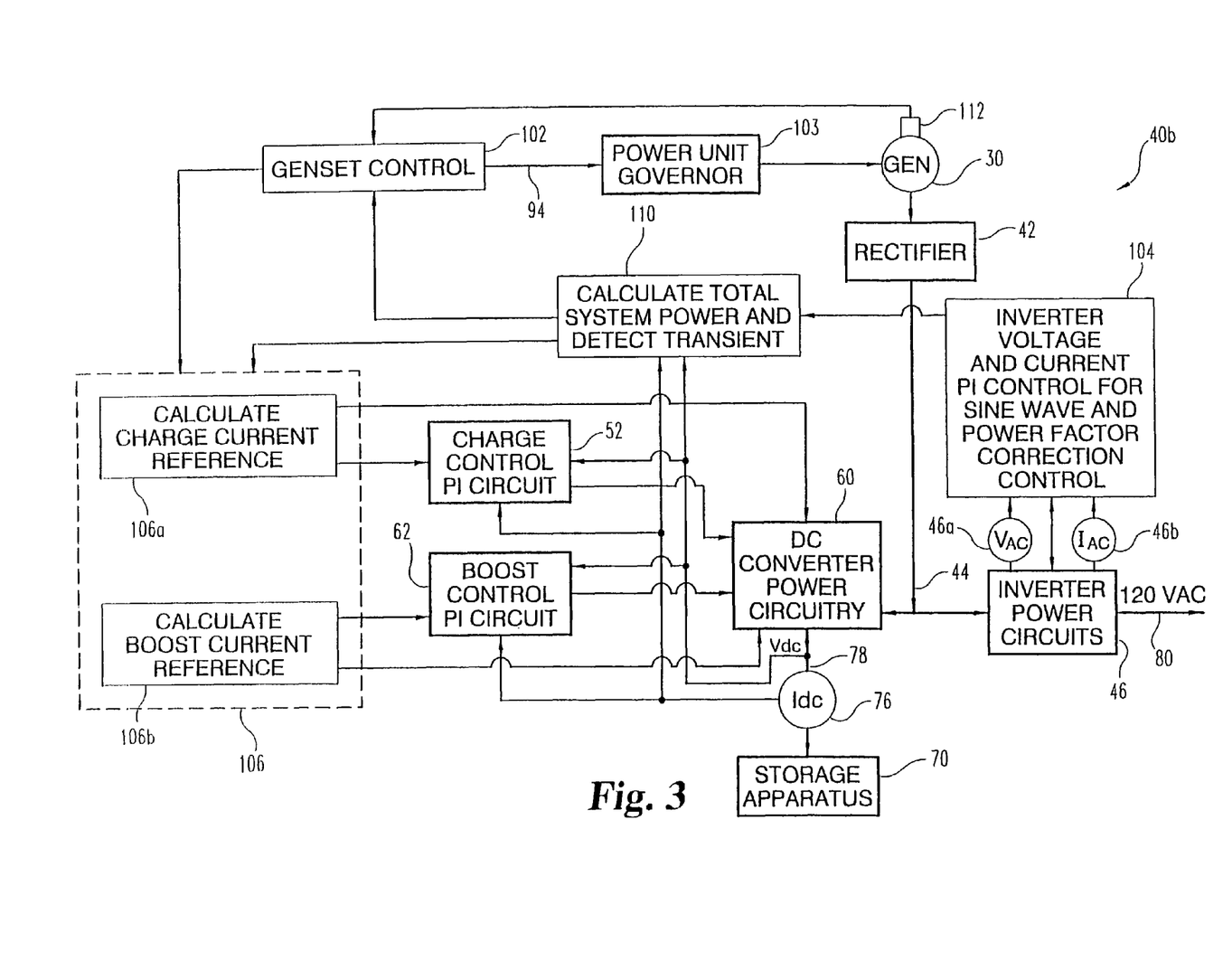
FIG. 3 is a control flow diagram for the circuitry of FIG. 2.

Referring additionally to the schematic circuit view of FIG. 2 and the control flow diagram of FIG. 3, selected aspects of subsystem 30a are further illustrated; where like reference numerals refer to like features previously described. It should be appreciated that subsystem 30b is identically configured except that it receives variable AC input power from generator 38b instead of generator 38a, and supplies its AC output on bus 80b instead of bus 80a. Further, while the controller 100 of each subsystem 30a and 30b are coupled to a common communication bus 94, they operate in master/slave relationship with respect to certain functional aspects of system 28, including control of engine 32 via engine controller 34 as described more fully hereinafter.

In FIG. 3, blocks formed with heavier line weighting correspond to hardware-implemented functionality, and blocks formed with lighter line weighting correspond to software-implemented functionality provided by programming of controller 100. Subsystem 30a includes Electromagnetic Interference (EMI) filter 38 coupled to three-phase rectifier 42. In one form, rectifier 42 is implemented with a standard six diode configuration applicable to three-phase AC-to-DC conversion. Rectifier 42 receives the EMI-filtered, three-phase AC electric power output from genset 30 when genset 30 is operational. Filter 38 removes certain time varying characteristics from the genset output that may result in undesirable inference and rectifier 42 converts the filtered three-phase AC electric power from genset 30 to a corresponding DC voltage on bus 44.

At least one capacitor 45 is coupled across DC bus 44 to reduce residual "ripple" and/or other time varying components. The DC voltage on bus 44 is converted to an AC voltage by inverter 46 in response to inverter control logic 104 of controller 100. In one form, inverter 46 is of a standard H-bridge configuration with four Insulated Gate Bipolar Transistors (IGBTs) that is controlled by Pulse Width Modulated (PWM) signals from controller 100. In other forms, inverter 46 can be comprised of one or more other switch types such as field effect transistors (FETs), gated thyristors, silicon controlled rectifiers (SCRs), or the like. The PWM control signals from logic 104 selectively and individually drive the gates/switches of inverter 46. Typically, these control signals are input to intervening power drive circuitry coupled to inverter gates, and the control signals are isolated by opto-isolators, isolation transformers, or the like. Inverter control logic 104 includes a Proportional-Integral (PI) controller to synthesize an approximate sinusoidal AC waveform. Sensing arrangement 45 includes AC voltage sensor 46a and AC current sensor 46b. Control logic 110 receives AC voltage (VAC) from voltage sensor 46a and AC current (IAC) from current sensor 46b that correspond to the power delivered to bus 80a from inverter 46. The VAC and IAC inputs to logic 104 are utilized as feedback to generate the sinusoidal waveform for the output power with a PI controller. In addition, these inputs are used to calculate power properties required to control sharing functions for the overall system and determine the power factor for the sinusoidal voltage and current outputs to facilitate power factor correction via a PI controller. Control logic 110 receives AC power output information from inverter control logic 104. This information can be used to determine system power, and is used to compare with the power delivery capacity of genset 30 and device 70 to regulate certain operations described hereinafter. Furthermore, logic 110 uses this AC output information to determine whether a transient power condition exists that warrants consideration.

Inductor 47a and capacitor 47b provide further filtering and conversion of the inverter 46 output to a controlled AC power waveform. EMI filter 48 provides interference filtering of the resulting AC power waveform to provide a regulated single-phase AC power output on bus 80. In one nonlimiting example, a nominal 120 VAC, 60 Hertz (Hz) output is provided on bus 80, the genset three-phase output to rectifier 42 varies over a voltage range of 150-250 volts AC (VAC) and a frequency range of 200-400 Hertz (Hz), and the variable voltage on DC bus 44 is between 200 and 300 volts DC (Vdc)

In addition to inverter control logic 104, controller 100 includes genset power request control logic 102 to regulate rotational speed of genset 30 relative to system 28 operations through communication with engine controller 34 via bus 94. Logic 102 provides input signals to genset 30 that are representative of a requested target electrical load to be powered by genset 30. Genset governor 103 defined by engine controller 34 responds to logic 102 to adjust engine rotational speed, which in turn adjusts rotational speed of generator 34. Control by logic 102 is provided in such a manner that results in different rates of engine speed change (acceleration/deceleration) depending on one or more conditions (like transients), as more fully explained in connection with FIGS. 4 and 5 hereinafter.

In one particular form, governor 103 is fully implemented in engine controller 34 that is included with genset 30. Alternatively or additionally, at least a portion of governor 103 can be included in circuitry 40. Control logic 102 is responsive to system control logic 110 included in the operating logic of controller 100, and an engine speed feedback signal provided by engine speed sensor 112 and/or by monitoring AC frequency of the variable output of generator 38a. Speed adjustment with logic 102 can arise with changes in electrical loading and/or charge or boost operations of device 70, as further described hereinafter. In turn, logic 102 provides control inputs to charge and power boost control logic 106.

Controllable DC-to-DC converter 60 is electrically coupled to DC bus 44 and electrical energy storage device 70. In FIG. 2, device 70 is more specifically illustrated in the form of electrochemical battery device 75. Electrical current flow between device 70 and converter 60 is monitored with current sensor 76 and DC voltage of device 70 is monitored at node 78. In one embodiment, more than one current sensor and/or current sensor type may be used (not shown). For example, in one arrangement, one sensor may be used to monitor current of device 70 for power management purposes (such as a Hall effect sensor type), and another sensor may be used in monitoring various charging states (such as a shunt type). In other embodiments, more or fewer sensors and/or sensor types may be utilized.

Converter 60 provides for the bidirectional transfer of electrical power between DC bus 44 and device 70. Converter 60 is used to charge device 70 with power from DC bus 44, and to supplement (boost) power made available to DC bus 44 to service power demand on bus 80 (see FIG. 1). Converter 60 includes DC bus interface circuitry 54 and storage interface circuitry 64 under the control of charge and power boost control logic 106. Bus interface circuitry 54 includes a charge inverter 54a and power boost rectifier 54b. Storage interface circuitry 64 includes charge rectifier 64a and power boost inverter 64b. Transformer 58 is coupled between circuitry 54 and circuitry 64. Charge inverter 54a and boost inverter 64b can be of an H-bridge type based on IGBTs, FETs (including MOSFET type), gated thyristors, SCRs, or such other suitable gates/switching devices as would occur to those skilled in the art. Further, while rectifiers 54b and 64a are each represented as being distinct from the corresponding inverter 54a or 64b, in other embodiments one or more of rectifiers 54b and 64a can be provided in the form of a full wave type comprised of protective "free wheeling" diodes electrically coupled across the outputs of the respective inverter 54a or 64b. For rectifier operation of this arrangement, the corresponding inverter components are held inactive to be rendered nonconductive.

Charge Proportional-Integral (PI) control circuit 52 is electrically coupled to charge inverter 54a and power boost PI control circuit 62 is electrically coupled to power boost inverter 64b. Circuits 52 and 62 each receive respective charge and boost current references 106a and 106b as inputs. Electrical current references 106a and 106b are calculated by charge and power boost control logic 106 with controller 100. These references are determined as a function of power demand, system power available, and the presence of any transient power conditions. The total system power is in turn provided as a function of the power provided by inverter 46 to bus 80 (inverter power), the power-generating capacity of genset 30, and the power output capacity of device 70. The inverter power corresponds to the AC electrical load "power demand" as indicated by the VAC voltage, IAC current, and corresponding power factor that results from electrical loading of bus 80. The genset power-generating capacity is determined with reference to genset power/load requested by logic 102. When the power demand on bus 80 can be supplied by genset 30 with surplus capacity, then this surplus can be used for charging device 70 by regulating converter 60 with PI control circuit 52; and when the power demand exceeds genset 30 capacity, supplemental power can be provided to bus 80 from device 70 by regulating converter 60 with PI control circuit 62. Various aspects of dynamic "power sharing" operations of system 28 are further described in connection with FIGS. 4 and 5 hereinafter; however, further aspects of converter 60 and its operation are first described as follows.

Converter 60 is controlled with system control logic 110 to enable/disable charge and boost operations. Under control of logic 110, the charge mode of operation and the boost mode of operation are mutually exclusive—that is they are not enabled at the same time. However, it should be appreciated that in system 28, subsystems 30a and 30b operate independent of one another in such respects, so that both may be operating in charge mode, in boost mode, or one in each mode. From the perspective of device 70, it is providing electric power (boosting) or is receiving electric power (charging) based on the quantitative sum of boost or charge being performed by subsystems 30a and 30b. When multiple batteries are used in parallel, subsystems 30a and 30b can be coupled at different ends of the parallel arrangement to assure a more even current flow throughout the batteries.

When charge mode is enabled, the electrochemical battery form of device 70 is charged in accordance with one of several different modes depending on its charging stage. While charging, circuit 52 outputs PWM control signals that drive gates of charge inverter 54a in a standard manner. Typically, the PWM control signals are input to standard power drive circuitry (not shown) coupled to each gate input, and may be isolated therefrom by optoisolators, isolation transformers, or the like. In response to the PWM input control signals, inverter 54a converts DC power from DC bus 44 to an AC form that is provided to rectifier 64a of circuitry 64 via transformer 58. Rectifier 64a converts the AC power from transformer 58 to a suitable DC form to charge battery device 75. In one form directed to a nominal 12 Vdc output of battery device 75, transformer 58 steps down the AC voltage output by inverter 54a to a lower level suitable for charging storage device 70. For nonbattery types of devices 70, recharging/energy storage in the "charge mode" is correspondingly adapted as appropriate.

When power boost mode is enabled, boost PI control circuit 62 provides PWM control signals to boost inverter 64b to control the power delivered from device 70. The circuit 62 output is in the form of PWM control signals that drive gates of boost converter 64b in a standard manner for a transformer boost configuration. Typically, these control signals are input to power drive circuitry (not shown) with appropriate isolation if required or desired. When supplementing power provided by generator 32, a current-controlled power boosting technique is implemented with circuit 62. Circuit 62 provides proportional-integral output adjustments in response the difference between two inputs: (1) boost current reference 106b and (2) storage device 70 current detected with current sensor 76. In response, inverter 64b converts DC power from device 70 to an AC form that is provided to rectifier 54b of circuitry 54 via transformer 58. Rectifier 64b converts the AC power from transformer 58 to a suitable DC form for DC bus 44. In one form directed to a nominal 12 Vdc output of device 70, transformer 58 steps up the AC voltage output from inverter 64b, that is converted back to DC power for bus 44.

Figure 4:
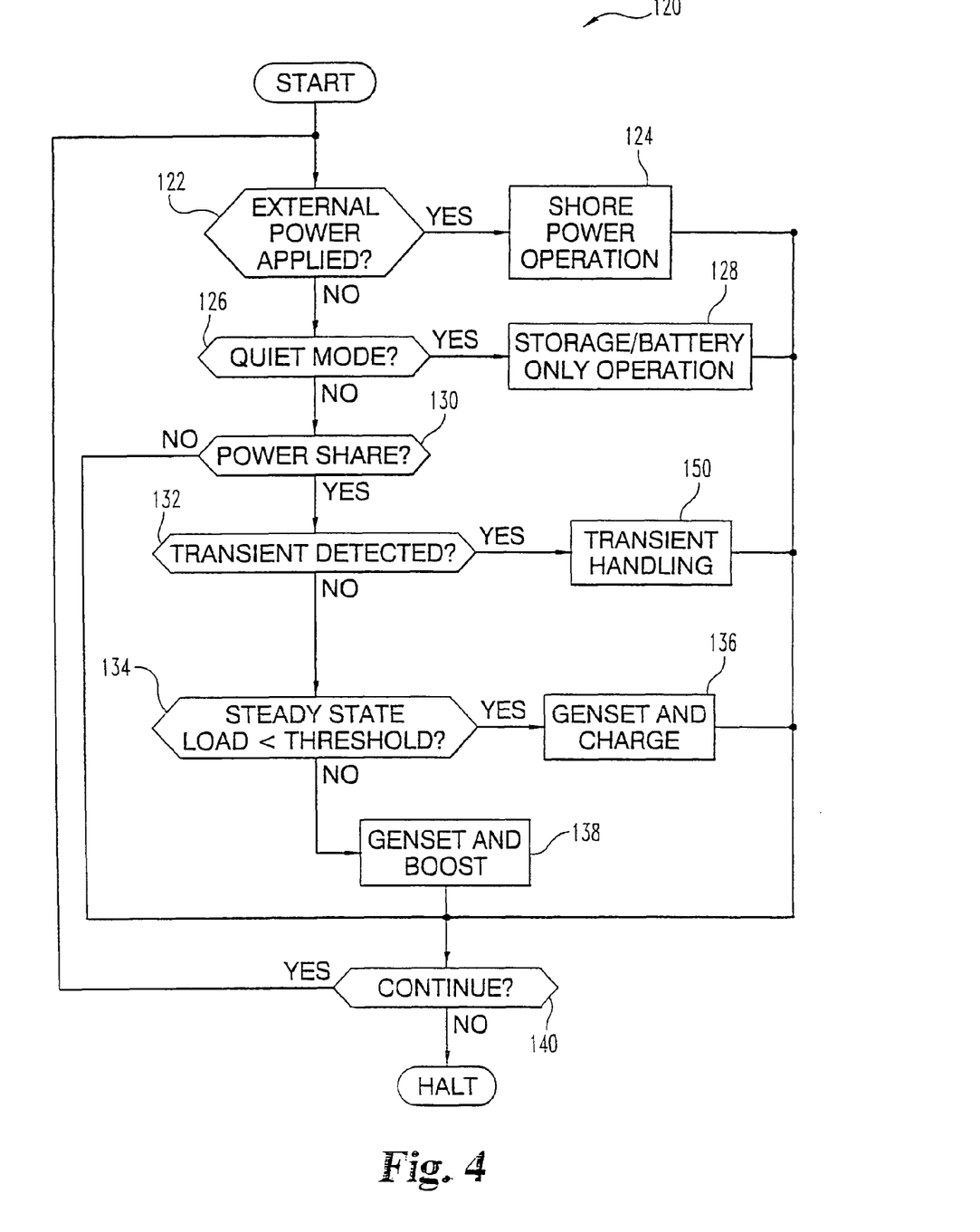
FIG. 4 is a flowchart of one procedure for operating the subsystems of FIG. 1.

FIG. 4 depicts power management procedure 120 for system 28 that is performed in accordance with operating logic executed by controller 100 for each subsystem 30a and 30b. Also referring to FIGS. 1-3, procedure 120 begins with conditional 122 that tests whether shore power from external source 90 is being applied. If the test of conditional 122 is true (yes) then shore power operation 124 is performed. In operation 124, shore power is applied from bus 80 to charge device 70, using the "free wheeling" diodes of inverter 46 to rectify from AC to DC power. During operation 124, shore power is also provided to loads 83 and 84 via switch 82.

If the test of conditional 122 is false (no), procedure 120 continues with conditional 126. Conditional 126 tests whether system 28 is operating in a quite mode. If the test of conditional 126 is true (yes), then the storage/battery only operation 128 is performed. Quite mode is typically utilized when the noise level resulting from the operation of genset 30 is not permitted or otherwise not desired and when shore power is not available or otherwise provided. Correspondingly, in operation 128 genset 30 is inactive, and power is provided only from storage device 70. For operation in this quiet mode, power delivered by storage device 70 is voltage-controlled rather than current-controlled, supplying a generally constant voltage to DC bus 44 to facilitate delivery of an approximately constant AC voltage on bus 80. Conditionals/operators 122-128 are performed at the same time by both subsystems 30a and 30b.

Operator Input/Output (I/O) device 115 is operatively connected to controllers 100 to provide various operator inputs to system 28 and output status information. In one nonlimiting form, device 115 is mounted in a cabin of coach 22 and is in communication with controllers 100 of circuitry 40 via bus 94.

If the test of conditional 126 is false (no), then conditional 130 is encountered. Conditional 130 tests whether power share mode is active. In response to changes in electrical loading of system 28, the power share mode dynamically adjusts the speed of genset 30 under direction of controller 100 of subsystem 30a based in part on communications with controller 100 of subsystem 30b. Boost/charge is independently controlled by the subsystems 30a and 30b. It should be appreciated that this regulation is based on total power for each subsystem 30a and 30b, which accounts for: (a) AC power output from inverter 46 as measured by inverter voltage and current, (b) the DC power as measured at the storage device, and (c) the power loss intrinsic to circuiting 40a and 40b. The loss calculation facilitates determination of a target genset speed and boost rate for steady state operation, as further discussed in connection with operation 138.

If the test of conditional 130 is true (yes), then conditional 132 is executed. Conditional 132 tests whether a power level change or transient has been detected. If the test of conditional 132 is true (yes), then transient handling operation 150 is performed as further described in connection with FIG. 5. Different criteria or "tests" may be used to detect different kinds of transients that are subject to conditional 132, as further described hereinafter. If the test of conditional 132 is false (no), then the power is at steady state in the power share mode. Steady state power delivery occurs in one of two ways contingent on the steady state electrical load magnitude, as implemented by conditioned 134, which tests whether the electrical load is below a selected threshold related to available genset 30 power (steady state genset rating). This test involves adding the DC and AC power levels, accounting for losses, and comparing the total power to the genset power rating to determine if simultaneous charging of device 70 can be performed. If so, the test of conditional 134 is true (yes) and operation 136 is performed.

In operation 136, a "genset plus charge" power share mode is supported that uses excess genset capacity for charging device 70, as needed (charge enabled/boost disabled). The genset plus charge power share mode of operation 136 typically reaches steady state from a transient condition as further described in connection with operation 150. The total genset power in the genset plus charge mode is determined as the measured AC power output plus the measured DC charging power less estimated charger losses. In one form, the charger loss is estimated by reference to one or more tables containing the loss of the charger circuitry as a function of battery voltage and charge current. The target genset speed is then determined based on the normalized load. The genset speed is set to support the DC and AC loads. When the genset reaches the rated charge level, its speed may be reduced. As the AC power requirement approaches the genset rating, the charge rate may be reduced in order to maintain load support with genset 30.

If the test of conditional 134 is false (no), then operation 138 results. In operation 138, genset 30 and device 70 are both utilized to provide power to the electrical load at steady state in a "genset plus boost" power share mode. The desired boost rate is calculated based on total AC and DC power requirements less loss. This rate controls boost current to reach the desired power share between the genset and the storage device. The boost rate is calculated by determining the desired storage power contribution to the system load and referencing one or more tables that represent the loss of boost circuitry as a function of battery voltage and current. Conditional 134 and operations 136 and 138 are also performed independently by each subsystem 30a and 30b.

Typically, for this steady state condition, genset 30 is operating at an upper speed limit with additional power being provided from device 70 in the boost enabled mode. It should be understood that this genset plus boost power share operation also typically reaches steady state from a transient condition as further described in connection with operation 150 as follows. In one form, the load calculations are normalized to a percent system rating, a percent boost capability and a percent genset load to facilitate system scaling for different genset and boost sizes. The implementation of operation 150 by subsystems 30a and 30b is further described in connection with FIG. 5 hereinafter.

Continuing with FIG. 4 first, operations 124, 128, 136, and 138 proceed to conditional 140. Conditional 140 tests whether to continue operation of process 120. If conditional 140 is true (yes), process 120 returns to conditional 122 to re-execute the remaining logic. If conditional 140 is false (no), process 120 halts.

In operation 150, there may be multiple types of transient conditions identified. For transients of a smaller degree, initially they may be handled by subsystems 30a and 30b independent of one another. In contrast, for certain large transient conditions imposed on one of the subsystems 30a or 30b, its existence may dictate the response irrespective of the transient status of the other of the subsystems 30a or 30b. For example, a large increase in electrical load on one of subsystems 30a or 30b can result in the desire to increase the speed of genset 30 with maximum acceleration despite electrical loading of the other subsystem 30a or 30b.

Figure 5:
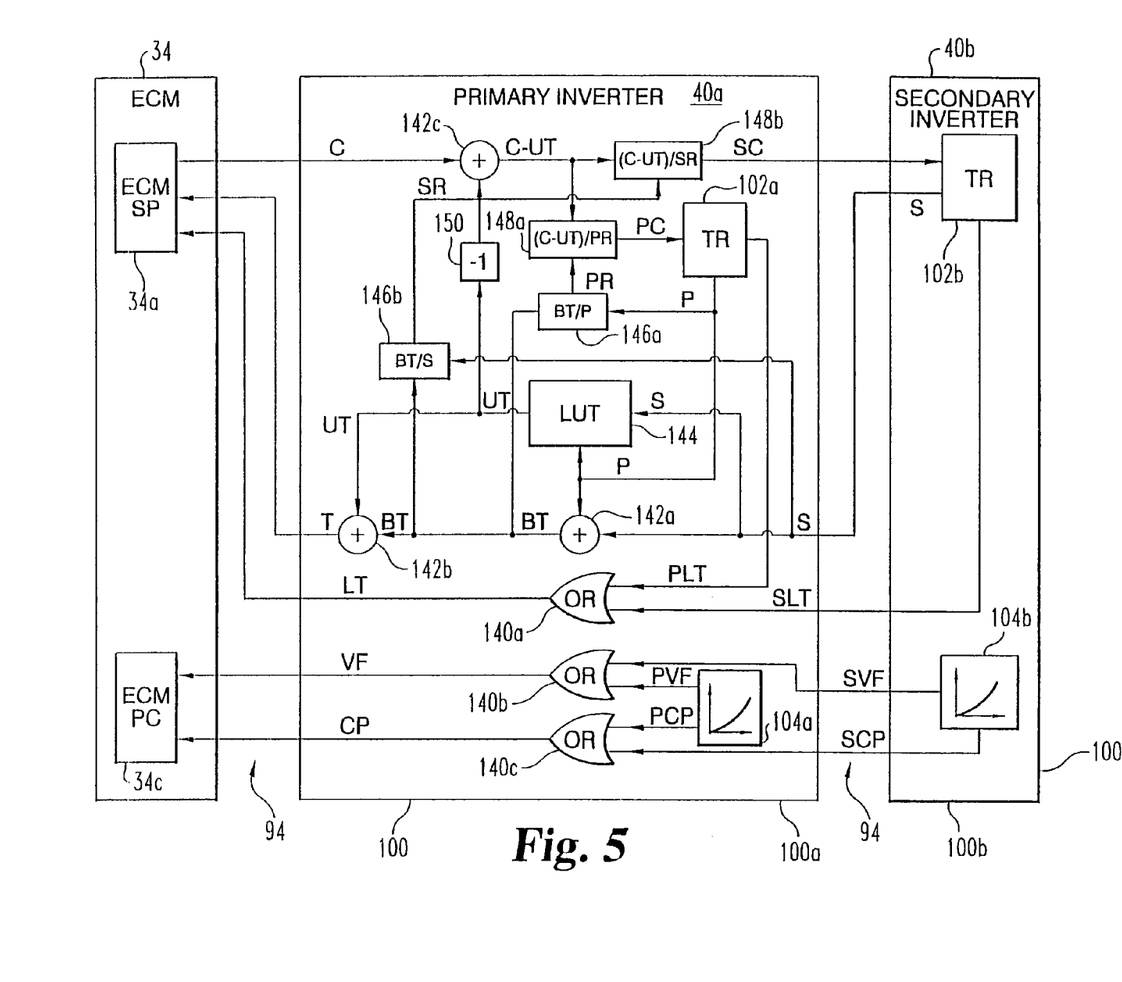
FIG. 5 is a diagram depicting operating logic for controlling the subsystems of FIG. 1.

FIG. 5 depicts control logic 120 for regulating operation of primary inverter 41a of subsystem 30a and secondary inverter 41b of subsystem 30b with respect to transient conditions, including the regulation of load imbalances therebetween; where like reference numerals refer to like features. Logic 120 is depicted as primary operational logic 100a for primary inverter 41a and secondary operational logic 100b for secondary inverter 41b. Logic 100a and 100b are each implemented with the corresponding controller 100 of each inverter 41a and 41b, respectively. For the depicted arrangement, inverter 41b operates relative to inverter 41b in a slave/master relationship, and communicate over bus 94. Likewise, connector 44a communicates with engine controller 34 and bus 94.

The function of logic 100a and 100b is next described in conjunction with the corresponding logical elements shown in FIG. 6. Logic 100a includes transient response (TR) logic 102a that determines the primary inverter target capacity designated as P and logic 100b includes TR logic 102b that determines the secondary inverter target capacity designated as S. Target capacity S is sent to logic 100a of inverter 41a that sums target capacity S and P together with adder 142a. Adder 142a outputs the balanced target power unit capacity designated as BT (where BT=S+P). It has been discovered that when the loads on inverters 41a and 41b become unbalanced, it is sometimes desirable to have extra power capacity to take into account the effect unbalanced loading can have. This added capacity permits generation of the DC bus voltage at a level sufficient to keep distortion of the AC 120 V voltage output for each inverter 41a and 41b at a minimum. Accordingly, a variable unbalanced target power unit capacity designated by UT is added to the balanced target power unit capacity BT by adder 142b of logic 100a. The unbalanced target power unit capacity UT is determined from an unbalanced load Look Up Table (LUT) 144 based on the inputs of primary target capacity P and secondary target capacity S.

The specific output of LUT 144 is empirically (experimentally) determined for a given arrangement/application. In a typical application, the unbalanced target capacity UT output by LUT 144 is greatest when one of the two inverters 41 and 41b has a zero or a negligible load size while the other inverter has a load size that corresponds to half or more of the maximum engine speed (i.e. 50% target load capacity or more), and may be negligible (zero) when the smaller of the two inverter load sizes is below a certain threshold (in one application this threshold is about 22% of the maximum target power unit capacity). It may also be negligible if the two inverter load sizes are about or near the same sizes (i.e. balanced loading). It should be understood that the UT value can be provided in other ways such as from multiple LUTs, one or more mathematical expressions, schedules, a combination of these, or such different manner as would be known to those skilled in the art.

The output of adder 142b is the total target power unit capacity T (where T=BT+UT). Total target capacity T is sent to engine controller 34. In response, engine controller 34 adjusts rotational engine speed of engine 32 appropriately as designated by engine speed logic (ECM SP) 34a. Engine controller 34 also determines the power unit capacity of engine 32, designated as C, and sends power unit C to primary inverter 41a. Within logic 100a, power unit capacity C is reduced by the amount of unbalanced target capacity UT through the operation of negative multiplier 150 that outputs the negative form of UT and adder 142c that sums both C and negative UT (−UT) together. In other words, the output of adder 142c is the difference between C and UT (C−UT).

Each inverter 41a and 41b initially addresses transient responses with its corresponding TR logic 102a and 102b. As previously described, this logic is based on the individual power unit capacity of the corresponding inverter 46. To provide appropriate primary and secondary inverter power unit capacities (PC and SC) for TR logic 102a and 102b, respectively; logic 100a takes into account the ratio of each of the primary and secondary inverter target power unit capacities (S and P) to the total balanced target power unit capacity (BT) and otherwise provides an offset for UT. More specifically, logic 100a determines the ratio BT/P with divider 146a that is output as a primary power capacity ratio PR. The output of divider 146a (BT/P) is provided as the denominator and C-UT is provided as the numerator to divider 148a to provide primary inverter power unit capacity PC in ratio terms with any nonzero value of UT removed. Logic 100a also determines the ratio BT/S that is output by divider 146b as secondary power capacity ratio SR. SR is input as a denominator and C-UT is input as a numerator to divider 148b to provide secondary inverter power unit capacity SC in ratio terms with any nonzero value of UT removed. Secondary inverter power unit capacity SC is provided to TR logic 102b of secondary inverter 41b to perform transient response handling. It should be understood that if P is equal to zero then PC is set to zero without performing division with dividers 146a and 148a. Similarly, if S is equal to zero then SC is set to zero without performing division with dividers 146b and 148b.

The logic 102a and logic 102b each output a corresponding binary large transient signal PLT and SLT indicative of whether a large transient status applies to the respective inverter 41a or 41b. These signals are provided as inputs to a binary OR operator 140a that outputs the result as binary large transient signal LT. This logic insures that when at least one of the two inverter load sizes sets the large transient condition, the signal LT is set to true. Signal LT is input to engine controller 34 to provide a maximum speed increase in response to the state of the LT signal that indicates a large transient status of either inverter 41a and/or 41b. In effect, an active (true) large transient signal LT by passes any determination of engine speed based on the target power unit capacity T determined from both subsystems 30a and 30b. In contrast, when large transient LT is inactive (false), the target power unit capacity T governs, which may not involve maximum acceleration of engine 32. Instead, acceleration or deceleration of engine 32 may be constrained to a fixed rate of change less than the maximum rate of change available, as further described in U.S. patent application Ser. No. 11/600,937 filed 16 Nov. 2006 (previously incorporated by reference). In one implementation, this rate is selected to reduce human perception of engine noise indicative of a speed change. Alternatively or additionally, adjustment in boost or charge by TR logic 102a and/or 102b can influence the corresponding target power capacity signals P and S from the primary inverter 41a and secondly inverter 41b—influencing the variable T output to engine 32.

Logic 102a and logic 102b also each include logic operators 104a and 104b that output binary vent and coolant pump commands to regulate thermal aspects of operation. Specifically, operator 104a selectively outputs primary vent fan command PVF and primary coolant pump command PCP, and operator 104b selectively outputs secondary vent fan command SVF and secondary coolant pump command SCP. Commands PVF and SVF are provided as inputs to binary OR operator 140b, which outputs the dual inverter vent fan command VF that is sent to engine controller 34 as the logical "or" function of PVF and SVF. Commands PCP and SCP are provided as inputs to binary OR operator 140c, which outputs the dual inverter coolant pump command CP that is sent to engine controller 34 as the logical "or" function of PCP and SCP. Commands CP and VF are provided to ECM Pump Control (ECM PC) module 34c that adjusts pump operation as appropriate.

To maintain synchronization between inverters 41a and 41b the primary inverter 41a counts every three AC cycles it generates as delineated by a zero crossings. With every three cycles, the primary inverter 41a communicates a synchronization signal to the secondary inverter 41b to facilitate synchronization of its output waveform with the primary inverter 41a. In one form, this synchronization signal can be treated like an interrupt signaling the start of the generation of three AC cycles. The secondary inverter 41b also sends a synchronization signal at the end of its three AC cycles to indicate that it is performing the inverting function.

In a further embodiment, it is desirable that start-up of the inverters 41a and 41b be synchronized such that an initial full 240 V output is provided minimal distortion. For this embodiment, an initial synchronization sequence can be executed to insure that the two inverters 41a and 41b begin inverter operation within a negligible delay of one another. In one form, this sequence includes: (a) the primary inverter 41a sending a synchronization signal to the secondary inverter 41b when it is ready to start inverting (i.e. generating the 120 V AC voltage signal) and then waits to receive a synchronization signal (as an acknowledgement) from the secondary inverter 41b; (b) the secondary inverter 41b waits to receive a synchronization signal from the primary inverter 41a when it is ready to start inverting; (c) when the secondary inverter 41b receives the first synchronization signal from the primary inverter 41a, the secondary inverter 41b1 sends a synchronization signal to the primary inverter 41a (as an acknowledgement) and starts inverting in its next interrupt cycle; and (d) the primary inverter 41a waiting for the acknowledgement synchronization signal from the secondary inverter 41b, starts inverting after receiving the acknowledgement synchronization signal from the secondary inverter 41b. This initial synchronization is only performed at the start of inverting for both inverters 41a and 41b. If the primary inverter 41a does not get acknowledged after it has sent its first synchronization signal to the secondary inverter 41b for a pre-determined amount of time (in one implementation 3 sec), the primary inverter 41a shuts down, which in turn causes the secondary inverter 41b to shut down. Once synchronization is initially successful, synchronization is maintained by sending a periodic signal from the primary inverter 41a to the secondary inverter 41b (in one form, every three AC cycles as described above). After a successful initial synchronization is performed, a lack of reception of a predetermined number of consecutive synchronization signals causes the inverter 41a or 41b not receiving the synchronization signal to shutdown, which in turn causes the other inverter 41a or 41b to shutdown. In one instance, the predetermined number is 6. In the case of a shutdown of one of inverters 41a or 41b, the other is also shutdown, regardless of cause, which can be implemented through the use of an external (fault) shutdown signal that is sent from one inverter 41a or 41b to the other inverter 41a or 41b. In another variation there are two generators driven by a common engine with two inventors as shown for system 28, but only one has a boost/charge capability. In this case, the boost can include two isolated outputs that could be routed to either inverter as desired.

Many other embodiments of the present application exist. For example, one or more fuel cell devices, capacitive-based storage devices, and/or a different form of rechargeable electrical energy storage apparatus could be used as an alternative or addition to an electrochemical cell or battery type of storage device 70. Furthermore, one or more fuel cells (including but not limited to a hydrogen/oxygen reactant type) could be used to provide some or all of the power from genset 30 and/or energy storage device 70. Engine 32 can be gasoline, diesel, gaseous, or hybrid fueled; or fueled in a different manner as would occur to those skilled in the art. Further, it should be appreciated that engine 32 can be different than a reciprocating piston, intermittent combustion type, and/or coach engine 26 can be used in lieu of engine 32 to provide mechanical power to generator 34 or to supplement mechanical power provided by engine 32. In still another embodiment, the vehicle carrying system 28 is a marine vessel. In one variation of this embodiment, rotational mechanical power for generator 34 is provided from a propulsion shaft (such as a propeller shaft) with or without engine 32. Alternatively or additionally, generator 34 can be of a different type with adaptation of circuitry/control to accommodate such different generator type, as desired. In yet other embodiments, more or fewer controllers are utilized and may or may not be arranged in a master/slave relationship.

A further embodiment of the present application includes: an internal combustion engine, a first variable speed generator driven by the engine, a second variable speed generator driven by the engine, a first inverter to convert variable electric power from the first variable speed generator to provide a first controlled AC voltage at a first electrical output node, and second inverter to convert variable electric power from the second variable speed generator to provide a second controlled AC voltage and a second electrical output node. The first inverter and the second inverter are electrically connected together with a common electrical node to provide a third controlled AC voltage across the first output node and the second output node greater than each of the first controlled AC voltage and the second controlled AC voltage.

In another embodiment, an apparatus comprises: a motor coach, a trailer, a camper, a truck, a bus, or a watercraft including an internal combustion engine, a first variable speed generator driven by the engine, a second variable speed generator driven by the engine, a first inverter to convert variable electric power from the first variable speed generator to provide a first controlled AC voltage, and a second inverter to convert variable electric power from the second variable speed generator to provide a second controlled AC voltage.

Yet another embodiment includes: a first variable speed generator, a second variable speed generator, a first rectifier connected to the first variable speed generator, a first DC bus connected to the first rectifier, a first inverter connected to the first DC bus, a second rectifier connected to the second variable speed generator, a second DC bus connected to the second rectifier, a second inverter connected to the second DC bus, and at least one energy storage device electrically coupled to at least one of the first DC bus and the second DC bus.

Still another embodiment includes: with a vehicle, carrying a first variable speed electric generator, a second variable speed electric generator, a first inverter coupled to the first generator, and a second inverter coupled to the second generator; driving the first variable speed electric generator and the second variable speed electric generator, and controlling the first inverter and the second inverter to provide a first electric power output with a first controlled AC voltage across one of the first inverter and the second inverter, and a second electric power output with a second controlled AC voltage across both the first inverter and the second inverter, the second AC voltage being greater than first AC voltage.

A further embodiment comprises: carrying an electrical power generation system with a vehicle, the system including an internal combustion engine with a drive shaft, a first variable speed electric power generator, a second variable speed electric power generator; turning the first generator and the second generator with the drive shaft to provide a first power output from the system with a first controlled AC voltage and second power output from the system at a second controlled AC voltage greater than the first controlled AC voltage; and propelling the vehicle with another engine.

Another embodiment of the present application comprises: operating a vehicular electrical power generation system including a variable speed internal combustion engine, a first variable speed electric power generator, a second variable speed electric power generator, a first inverter coupled to the first generator, and a second inverter coupled to the second generator; driving the first generator and the second generator with the internal combustion engine operating at a first speed to supply electric power through the first inverter and the second inverter; determining a degree of electrical load imbalance between the first inverter and the second inverter; and controlling operating speed of the internal combustion engine as a function of the degree of the electrical load imbalance.

Yet another embodiment of the present invention includes a vehicular electrical power generation system with the variable speed internal combustion engine, a first variable speed electric power generator, a second variable speed electrical power generator, a first inverter coupled to first generator, and a second inverter coupled to the second generator. Also included are means for driving the first generator and the second generator with an internal combustion engine operating a first speed to supply electric power through the first inverter and second inverter, means for determining a degree of electrical load imbalance between the first inverter and the second inverter, and means for controlling operating speed of the internal combustion engine as a function of the degree of the electrical load imbalance.

Still a further embodiment includes: operating a vehicular electric power generation system including a variable speed internal combustion engine, a first variable speed electric power generator, a second variable speed electric power generator, a first inverter coupled to the first generator, and second inverter coupled to the second generator; driving the first generator and the second generator with the internal combustion engine operating at a first speed to supply electricity through the first inverter and the second inverter; determining a change in electrical loading of the first inverter and the second inverter; and in response to the change in electrical loading, adjusting the internal combustion engine to operate at a second speed different than the first speed.

Another embodiment of the present application includes a vehicular electric power generation system with a variable speed internal combustion engine, a first variable speed electric power generator, a second variable speed electric power generator, a first inverter coupled to the first generator, and a second inverter coupled to the second generator. Also included are means for driving the first generator and the second generator with the internal combustion engine operating at a first speed to supply electricity through the first inverter and the second inverter, means for determining a change in electrical loading of the first inverter and the second inverter, and means for adjusting the internal combustion engine to operate at a second speed different than the first speed in response to the change in electrical loading.

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow. In reading the claims it is intended that when words such as "a," "an," "at least one," "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary. While the invention has been illustrated and described in detail in the drawings and foregoing description, the same is to be considered as illustrative and not restrictive in character, it being understood that only the selected embodiments have been shown and described and that all changes, modifications and equivalents that come within the

What is claimed is:

1. An apparatus, comprising:
an internal combustion engine;
a first variable speed generator driven by the engine;
a second variable speed generator driven by the engine;
a first inverter to convert variable electric power from the first variable speed generator to provide a first controlled AC voltage at a first electrical output node;
a second inverter to convert variable electric power from the second variable speed generator to provide a second controlled AC voltage at a second electrical output node, the first inverter and the second inverter being electrically connected together with a common electrical node to provide a third controlled AC voltage across the first output node and the second output node greater than each of the first controlled AC voltage and the second controlled AC voltage; and
means for controlling the first inverter and the second inverter to provide a first power output waveform at the first electrical output node and a second power output waveform at the second electrical output node, the first power output waveform being approximately 180 degrees out of phase with the second power output waveform and the common node corresponding to a neutral line.

2. The apparatus of claim 1, further comprising means for charging an electrical energy storage device with one or more of the first variable speed generator and the second variable speed general and means for boosting power output through one or more of the first inverter and the second inverter with the electrical energy storage device.

3. The apparatus of claim 1, further including another engine to provide propulsion for the motor coach, a trailer, a camper, or a watercraft.

4. The apparatus of claim 1, wherein the first generator includes a first armature and the second generator includes a second armature, the first armature and the second armature each being fixed to a common shaft driven by the internal combustion engine, and being provided as different three-phase AC outputs of an alternator winding.

5. An apparatus, comprising:
a first variable speed electric generator power;
a second variable speed electric generator power;
a first rectifier connected to the first variable speed generator, a first DC bus connected to the first rectifier, and a first inverter connected to the first DC bus;
a second rectifier connected to the second variable speed generator, a second DC bus connected to the second rectifier, and a second inverter connected to the second DC bus; and
at least one energy storage device electrically coupled to at least one of the first DC bus and the second DC bus,
the apparatus, further comprising means for controlling the first inverter and the second inverter to provide a first power output waveform at the first electrical output node and a second power output waveform at the second electrical output node, the first power output waveform being approximately 180 degrees out of phase with the second power output waveform and the common node corresponding to a neutral line.

6. The apparatus of claim 5, further comprising a vehicle with a first engine for propulsion and a second engine to drive both the first generator and the second generator.

7. The apparatus of claim 6, wherein the vehicle is one of a motor coach, a trailer, a camper, and a watercraft.

8. The apparatus of claim 5, wherein the first generator includes a first armature and the second generator includes a second armature, the first armature and the second armature each being fixed to a common shaft driven by the internal combustion engine.

9. A method, comprising:
with a vehicle, carrying a first variable speed electric power generator, a second variable speed electric power generator, a first inverter coupled to the first generator, and a second inverter coupled to the second generator,
driving the first variable speed electrical generator and the second variable speed electrical generator;
controlling the first inverter and the second inverter to provide a first electric power output with a first controlled AC voltage across one of the first inverter and the second inverter, and a second electric power output with a second controlled AC voltage across both of the first inverter and the second inverter, the second AC voltage being greater than the first AC voltage;
boosting at least one of the first electric power output and the second electric power output from an electrical energy storage device; and
charging the electrical energy storage device with at least one of the first generator and the second generator.

10. A method, comprising:
with a vehicle, carrying a first variable speed electric power generator, a second variable speed electric power generator, a first inverter coupled to the first generator, and a second inverter coupled to the second generator;
driving the first variable speed electrical generator and the second variable speed electrical generator;
controlling the first inverter and the second inverter to provide a first electric power output with a first controlled AC voltage across one of the first inverter and the second inverter, and a second electric power output with a second controlled AC voltage across both of the first inverter and the second inverter, the second AC voltage being greater than the first AC voltage,
wherein the first inverter and the second inverter are coupled together with a common neutral line, the first AC voltage is provided at a first output node of the first inverter, the second inverter provides a third AC voltage at a second output node, the third AC voltage is approximately 180 degrees out of phase with the first AC voltage, and the second AC voltage is provided across the first output node and the second output node.

11. A method, comprising:
with a vehicle, carrying a first variable speed electric power generator, a second variable speed electric power generator, a first inverter coupled to the first generator, and a second inverter coupled to the second generator,
driving the first variable speed electrical generator and the second variable speed electrical generator;
controlling the first inverter and the second inverter to provide a first electric power output with a first controlled AC voltage across one of the first inverter and the second inverter, and a second electric power output with a second controlled AC voltage across both of the first inverter and the second inverter, the second AC voltage being greater than the first AC voltage,
wherein the driving includes providing mechanical power for both the first generator and the second generator with a variable speed internal combustion engine and the controlling includes accounting for a load imbalance between the first inverter and the second inverter and responding to a electrical load changes by adjusting speed of the engine.

* * * * *

UNITED STATES PATENT AND TRADEMARK OFFICE
CERTIFICATE OF CORRECTION

| | | |
|---|---|---|
| PATENT NO. | : 7,956,584 B2 | Page 1 of 1 |
| APPLICATION NO. | : 11/809768 | |
| DATED | : June 7, 2011 | |
| INVENTOR(S) | : Mitchell E. Peterson et al. | |

It is certified that error appears in the above-identified patent and that said Letters Patent is hereby corrected as shown below:

Col. 15
line 34 replace "the" with --a--;
line 59 replace "the" with --a--.

Signed and Sealed this
Seventeenth Day of April, 2012

David J. Kappos
*Director of the United States Patent and Trademark Office*